(12) United States Patent
Rasmussen et al.

(10) Patent No.: US 7,191,643 B2
(45) Date of Patent: Mar. 20, 2007

(54) SENSOR SYSTEM TO DISTINGUISH FROZEN AND NON-FROZEN LIQUID PARTICULATES

(75) Inventors: Roy Martin Rasmussen, Longmont, CO (US); John Hallett, Reno, NV (US)

(73) Assignees: University Corporation for Atmospheric Research, Boulder, CO (US); The Board of Regents of the University & Community College Systems of Nevada on behalf of Desert Research Institute, Reno, NV (US)

( * ) Notice: Subject to any disclaimer, the term of this patent is extended or adjusted under 35 U.S.C. 154(b) by 0 days.

(21) Appl. No.: 11/025,214

(22) Filed: Dec. 22, 2004

(65) Prior Publication Data

US 2005/0268710 A1  Dec. 8, 2005

Related U.S. Application Data

(60) Provisional application No. 60/576,712, filed on Jun. 3, 2004.

(51) Int. Cl.
*G01W 1/00* (2006.01)
(52) U.S. Cl. .................................. 73/170.26
(58) Field of Classification Search ............ 73/861.04, 73/754, 170.16, 170.17, 170.19, 170.26; 340/581
See application file for complete search history.

(56) References Cited

U.S. PATENT DOCUMENTS

| | | | | |
|---|---|---|---|---|
| 3,440,396 A | * | 4/1969 | Greene, Jr. ................. | 219/201 |
| 4,068,133 A | * | 1/1978 | Burwell ...................... | 307/116 |
| 4,578,995 A | * | 4/1986 | Meyer ....................... | 73/170.17 |
| 4,760,272 A | * | 7/1988 | Wang ......................... | 250/573 |
| 4,890,494 A | * | 1/1990 | Osbond et al. ........... | 73/335.01 |
| 5,003,295 A | | 3/1991 | Kleven et al. | |
| 5,291,779 A | * | 3/1994 | Govoni et al. ........... | 73/170.17 |
| 5,443,271 A | * | 8/1995 | Holsen et al. ........... | 73/863.22 |
| 5,575,440 A | * | 11/1996 | LeBlond et al. ......... | 244/134 F |

(Continued)

FOREIGN PATENT DOCUMENTS

EP 1422137 5/2004

OTHER PUBLICATIONS

"In Situ Measurements of Cloud and Aerosol Properties Relevant to Precipitation Augmentation" Gabor Vali, Paper presented at the Workshop on Theoretical and Practical Aspects of a Regional Precipitation Enhancement Program for the Middle East and Mediterranean. Bari, Italy. Nov. 1996.*

*Primary Examiner*—Max Noori
(74) *Attorney, Agent, or Firm*—The Ollila Law Group LLP (57) ABSTRACT

A sensor system comprises a first sensor, a second sensor, and circuitry. The first sensor collects non-frozen liquid with a first collection efficiency, but does not collect frozen liquid. The second sensor collects non-frozen liquid with a second collection efficiency and also collects frozen liquid. The first collection efficiency and the second collection efficiency are substantially equivalent. The circuitry maintains the first sensor and the second sensor at a substantially constant temperature. The circuitry determines a measurement of the frozen liquid based on maintaining the first sensor and the second sensor at the substantially constant temperature. In some examples, multiple sensor systems can be used in combination to improve the accuracy of the measurement.

26 Claims, 10 Drawing Sheets

U.S. PATENT DOCUMENTS 5,639,964 A * 6/1997 Djorup .................... 73/170.12
5,744,711 A * 4/1998 Rasmussen et al. ..... 73/170.21
5,772,153 A * 6/1998 Abaunza et al. ......... 244/134 F
6,070,475 A * 6/2000 Muehlhauser et al. ... 73/861.68
6,134,958 A * 10/2000 Djorup .................... 73/170.12
6,430,996 B1 * 8/2002 Anderson et al. ........ 73/170.26
6,546,353 B1 * 4/2003 Hallett et al. ............... 702/130
6,847,903 B2 * 1/2005 Severson et al. ............. 702/54

* cited by examiner

SENSOR SYSTEM TO DISTINGUISH FROZEN AND NON-FROZEN LIQUID PARTICULATES

RELATED CASES

This patent application claims the benefit of provisional patent application 60/576,712; filed on Jun. 3, 2004; entitled "Ice and Liquid Sensor System for an Airborne Vehicle"; and which is hereby incorporated by reference into this patent application.

GOVERNMENT-FUNDED INVENTION

The Invention was made with Government support under Major Research Instrumentation (MRI) 63406630414 awarded by the National Science Foundation and under Agreement No. 98-C-00031 awarded by the Federal Aviation Administration. The Government has certain rights in this invention.

BACKGROUND OF THE INVENTION

1. Field of the Invention

The invention is related to the field of sensors, and in particular, to sensors that detect frozen and non-frozen liquid.

2. Statement of the Problem

Sensors that measure water and ice are well known. Special versions of these sensors have been developed for external airplane mounting. These special sensors collect data on ice and water concentrations in the atmosphere while the airplane is in flight.

Water Sensor

Figure 1:
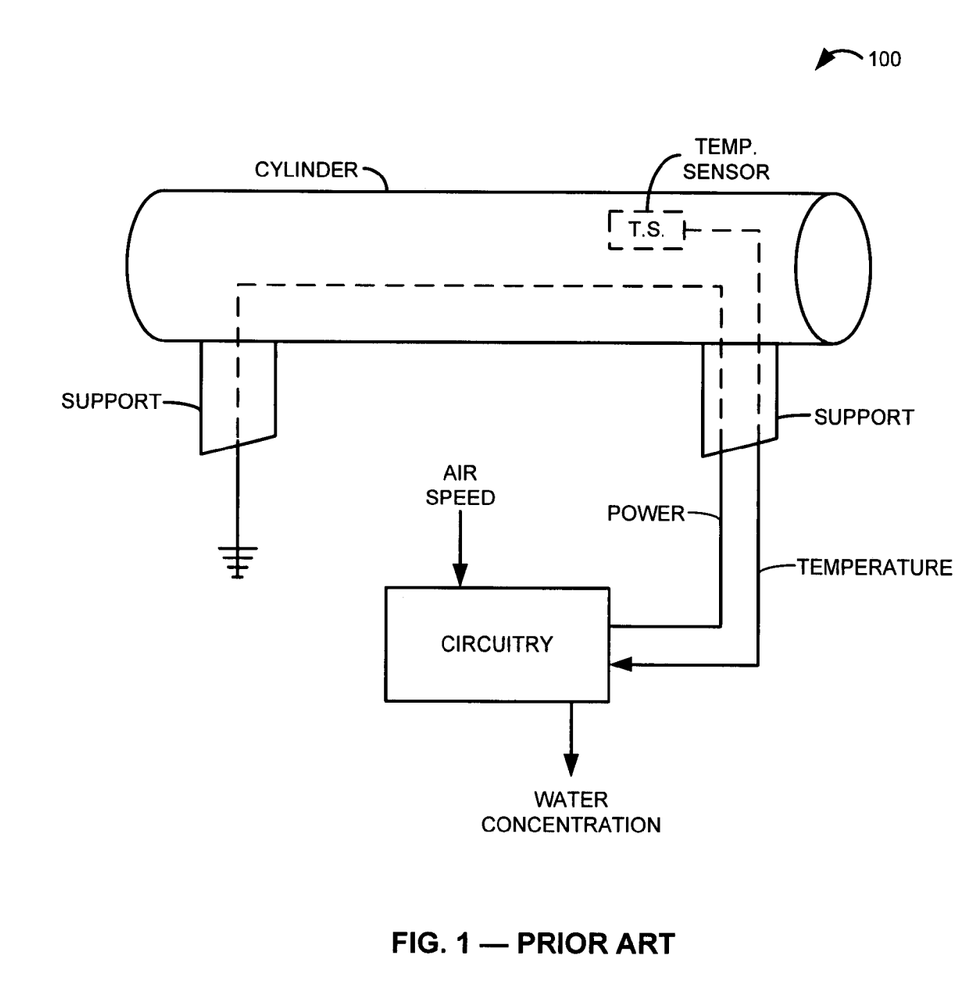
FIG. 1 illustrates a water sensor in an example of the prior art.

FIG. 1 illustrates water sensor 100 in an example of the prior art. Water sensor 100 is attached to an airplane, and as the airplane flies, sensor 100 detects non-frozen water in the atmosphere. Water sensor 100 includes a cylinder that has a temperature sensor and that is connected to two supports. The two supports are attached to the airplane. Water sensor 100 also includes circuitry and associated power and temperature wiring.

The temperature wiring runs from the temperature sensor to the circuitry. The power wiring runs from the circuitry through one support and the cylinder, and then back down the other support to a ground. Although not shown for clarity, the power wiring is typically wound around a core within the cylinder, and a thermal-conducting material surrounds the power wiring to form the exterior of the cylinder. Thus, the power wiring is able to heat the cylinder based on the power supplied by the circuitry.

The circuitry controls the power transferred over the power wiring to maintain the cylinder at a constant temperature. To perform this task, the circuitry receives a signal indicating the temperature of the cylinder from the temperature sensor over the temperature wiring. In response to the cylinder temperature, the circuitry adjusts the power transferred over the power wiring to maintain the constant temperature. Thus, if the cylinder temperature drops below the constant temperature, then the power is increased, but if the cylinder temperature rises above the constant temperature, then the power is decreased.

When water strikes the surface of the cylinder, the water spreads over the cylinder surface to provide a cooling effect. To maintain the constant temperature, more power is required to evaporate the water. Ice tends to bounce off of the cylinder, so the ice does not cause a similar increase in power. Thus, the amount of power consumed by the cylinder correlates to the concentration of water in the atmosphere through which the airplane flies.

In addition to water, wind also affects the power consumed by the cylinder. Wind that strikes the cylinder also provides a cooling effect, so as the wind increases, the power required to maintain the constant temperature also rises. As the wind striking the cylinder decreases, then the power required to maintain the constant temperature also decreases. The airspeed of the airplane is the dominant factor in generating the wind that strikes the cylinder.

The circuitry receives an indication of the air speed of the airplane, so the circuitry can allocate the appropriate amount of power consumption to wind, and thus, allocate the appropriate amount of power consumption to the water that strikes the cylinder. Once the power consumption due to the water is determined, the circuitry can determine the concentration of water in the atmosphere.

Although ice tends to bounce off of the cylinder, some ice may collect on the cylinder during flight. In an ice-only precipitation event, sensor 100 can detect this ice due to the power increase required to melt and evaporate the collected ice. The power increase would not correlate well to the concentration of water in the atmosphere because the cylinder's collection efficiency for ice is so poor. In a mixed ice-water precipitation event, the collected ice only serves to generate error in the water precipitation rate calculation.

Water sensor 100 has exhibited problems in practice. Water sensor 100 cannot provide any accurate data regarding ice. This problem is especially acute with respect to clouds, since small ice particles are prevalent in clouds and are of interest to pilots and scientists alike. Water sensor 100 has also proven to be fragile when mounted on an airplane. In addition, water sensor 100 has two supports that require separate attachments to the airplane. Although some attachment to the airplane is required, multiple attachments are not desirable when considering the structural integrity of the airplane.

Total Ice and Water Sensor

Figure 2:
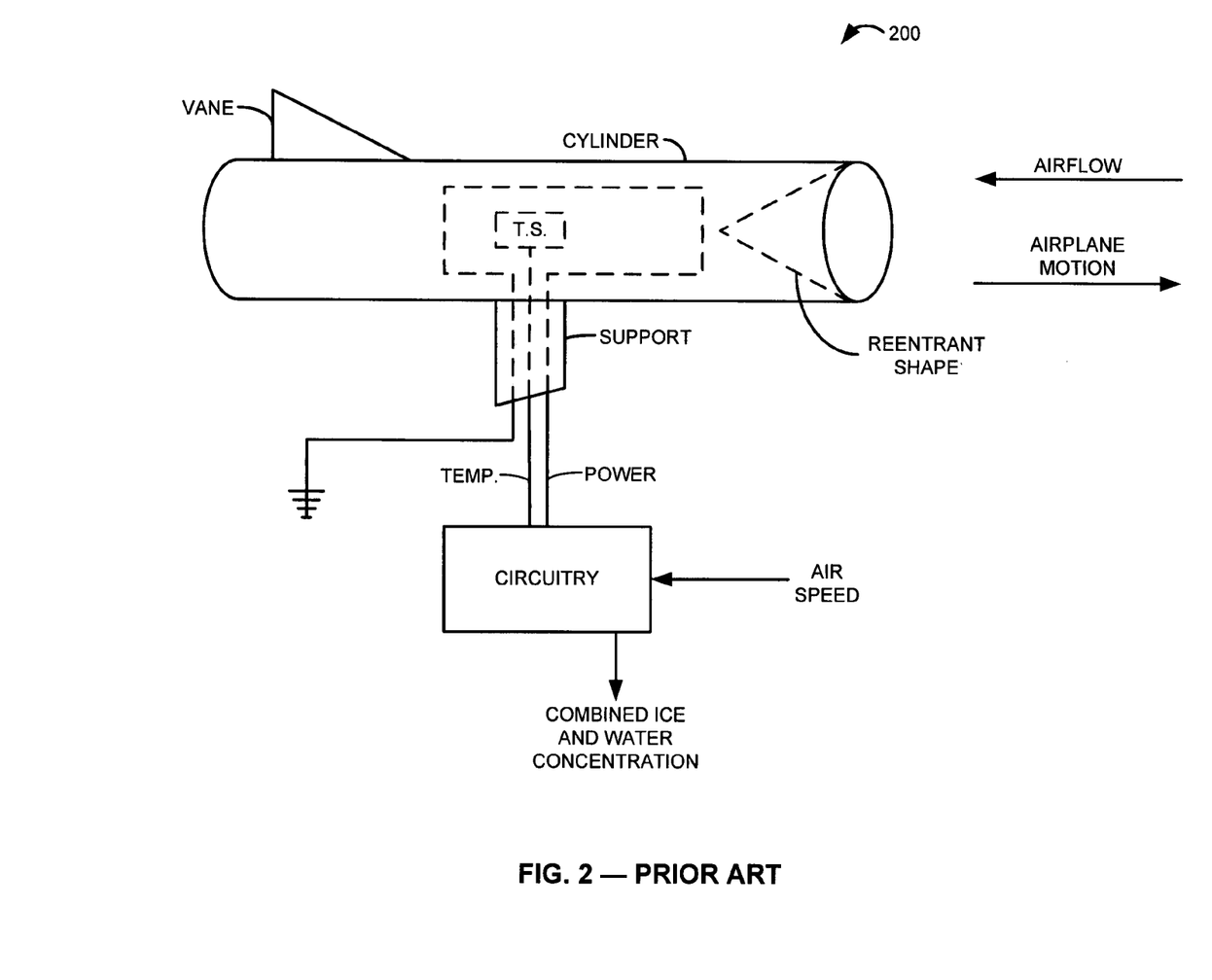
FIG. 2 illustrates an ice/water sensor in an example of the prior art.

FIG. 2 illustrates ice/water sensor 200 in another example of the prior art. Ice/water sensor 200 is also attached to an airplane, and as the airplane flies, ice/water sensor 200 detects the combined ice and water in the atmosphere. Ice/water sensor 200 includes a cylinder that has a temperature sensor and that is connected to a support. The support is attached to the airplane and allows the cylinder to rotate. A vane on the cylinder, along with the pivoting support, causes one end of the cylinder to point into the wind. The cylinder has a reentrant shape at the end that points into the wind. The reentrant shape forms an inverted cone that extends into the end of the cylinder that points into the wind. As the airplane flies, ice and water that enter the cone are trapped within the cone.

Ice/water sensor 200 also includes circuitry and associated power and temperature wiring. The temperature wiring runs from the temperature sensor to the circuitry. The power wiring runs from the circuitry through the support and the cylinder, and then back down the support to a ground. Thus, the power wire is able to heat the cylinder based on the power supplied by the circuitry.

The circuitry and power wiring maintain the cylinder at a constant temperature. To perform this task, the circuitry receives a signal indicating the temperature of the cylinder from the temperature sensor over the temperature wiring. In response to the cylinder temperature, the circuitry adjusts the power transferred over the power wiring to maintain the constant temperature. Thus, if the cylinder temperature drops below the constant temperature, then the power is increased, but if the cylinder temperature rises above the constant temperature, then the power is decreased.

Ice and water that are trapped in the cone provide a cooling effect, so more power is required to melt the ice and evaporate the melted ice and water to maintain the constant temperature. Thus, the amount of power consumed by the cylinder correlates to the concentration of both ice and water in the atmosphere through which the airplane flies.

In addition to water, wind also affects the power consumed by the cylinder. As the wind striking the cylinder increases, then the power required to maintain the constant temperature also rises. As the wind striking the cylinder decreases, then the power required to maintain the constant temperature also decreases. The airspeed of the airplane is the dominant factor in generating the wind that strikes the cylinder.

The circuitry receives an indication of the air speed of the airplane, so the control circuitry can allocate the appropriate amount of power consumption to wind, and thus, allocate the appropriate amount of power consumption to the ice and water that strike the cylinder. Once the power-consumption due to ice and water is determined, the circuitry can determine the combined concentration of ice and water in the atmosphere.

Ice/water sensor 200 has exhibited problems in practice. Ice/water sensor 200 cannot provide any accurate data regarding only ice, or regarding only wafer. This problem is especially acute in clouds where small particles of ice are prevalent, and are of interest to pilots and scientists alike. Ice/water sensor 200 has also proven to be fragile when mounted on an airplane. In addition, the aerodynamics caused by pointing the cylinder into the wind causes very small particles of ice and water that should fly into the cone to fly around the cone instead. This loss of small particles adds inaccuracy to the results, especially when a cloud is encountered that contains a large concentration of these smaller ice particles.

Ice/Water Sensor System

Sensors 100 and 200 can be used together to obtain data specific to the ice concentrations in the atmosphere. Ice/water sensor 200 is used to get the combined ice/water concentration, and water sensor 100 is used to get the water-only concentration. The water-only concentration is subtracted from the combined ice/water concentration to obtain the ice-only concentration.

Unfortunately, the combined use of sensors 100 and 200 to determine the ice-only concentration is prone to error, because sensors 100 and 200 have different collection efficiencies due to their different shape and size. The collection efficiency is a ratio of the total amount of water in a given volume versus the actual amount of water that is collected and evaporated by the sensor traveling through the volume. For example, water sensor 100 may collect and evaporate 95% of the water in a given volume, but ice water sensor 200 may only collect and evaporate only 80% of the water in the same volume. When the water concentration is subtracted from the ice/water concentration, the two water concentrations are not equivalent due to the different collection efficiencies of sensors 100 and 200. The resulting ice concentration is inaccurate because the two water concentrations were not equivalent.

In addition, ice/water sensor 200 does not collect some smaller ice particles, which further skews the result. The combined use of sensors 100 and 200 also leads to an undesirable number of attachments to the airplane. The combined use of sensors 100 and 200 does not provide a robust system that can stand up to the rigors of external airplane mounting.

SUMMARY OF THE INVENTION

Examples of the invention include a sensor system and its method of operation. The sensor system comprises a first sensor, a second sensor, and circuitry. The first sensor is configured to collect non-frozen liquid with a first collection efficiency, but not to collect frozen liquid. The second sensor is configured to collect non-frozen liquid with a second collection efficiency and to collect frozen liquid. The first collection efficiency and the second collection efficiency are substantially equivalent. The circuitry is configured to maintain the first sensor and the second sensor at a substantially constant temperature and to determine a measurement of the frozen liquid based on maintaining the first sensor and the second sensor at the substantially constant temperature.

Examples of the invention include a system of sensors comprising a first sensor system, a second sensor system, and circuitry. The first sensor system comprises a first sensor configured to collect non-frozen liquid with a first collection efficiency, but not to collect frozen liquid, and a second sensor configured to collect the non-frozen liquid with a second collection efficiency and to collect the frozen liquid. The first collection efficiency and the second collection efficiency are substantially equivalent. The second sensor system comprises a third sensor configured to collect the non-frozen liquid with a third collection efficiency, but not to collect the frozen liquid, and a fourth sensor configured to collect the non-frozen liquid with a fourth collection efficiency and to collect the frozen liquid. The third collection efficiency and the fourth collection efficiency are substantially equivalent. The circuitry is configured to maintain the first sensor and the second sensor at a first substantially constant temperature, and determine a first measurement of the frozen liquid based on maintaining the first sensor and the second sensor at the first substantially constant temperature. The circuitry is configured to maintain the third sensor and the fourth sensor at a second substantially constant temperature, and determine a second measurement of the frozen liquid based on maintaining the third sensor and the fourth sensor at the second substantially constant temperature. The circuitry is configured to process the first measurement and the second measurement together to produce a result. The first sensor and the second sensor have a first size, and the third sensor and the fourth sensor have a second size wherein the first size is larger than the second size. In some examples, the first sensor, the second sensor, the third sensor, and the fourth sensor comprises cylinders, where the first size comprises a first cylindrical diameter and the second size comprises a second cylindrical diameter. The first cylindrical diameter is larger than the second cylindrical diameter. Advantageously in some examples, multiple sensor systems can be used in combination to improve the accuracy of the measurements.

DESCRIPTION OF THE DRAWINGS

The same reference number represents the same element on all drawings.

DETAILED DESCRIPTION OF THE INVENTION

FIGS. 3–10 and the following description depict specific examples to teach those skilled in the art how to make and use the best mode of the invention. For the purpose of teaching inventive principles, some conventional aspects have been simplified or omitted. Those skilled in the art will appreciate variations from these examples that fall within the scope of the invention. Those skilled in the art will appreciate that the features described below can be combined in various ways to form multiple variations of the invention. As a result, the invention is not limited to the specific examples described below, but only by the claims and their equivalents.

In the following description, the term "water" refers to liquid water, and the term "ice" refers to frozen water. Note that the accompanying figures are illustrative and are not drawn to scale.

Sensor System

Figure 3:
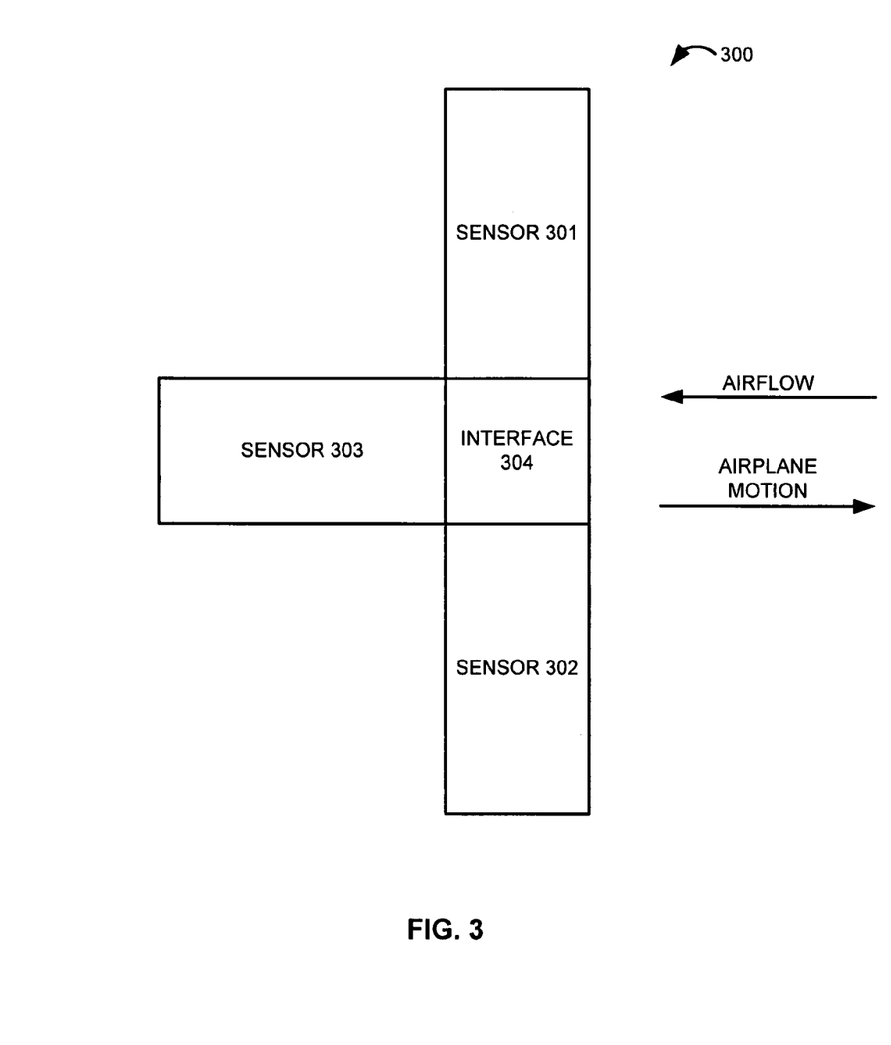
FIG. 3 illustrates a sensor system in an example of the invention.

FIG. 3 illustrates a top view of sensor system 300 in an example of the invention. Sensor system 300 includes sensors 301–303 that are each coupled to interface 304. Interface 304 can be coupled to an airplane (not shown).

Figure 4:
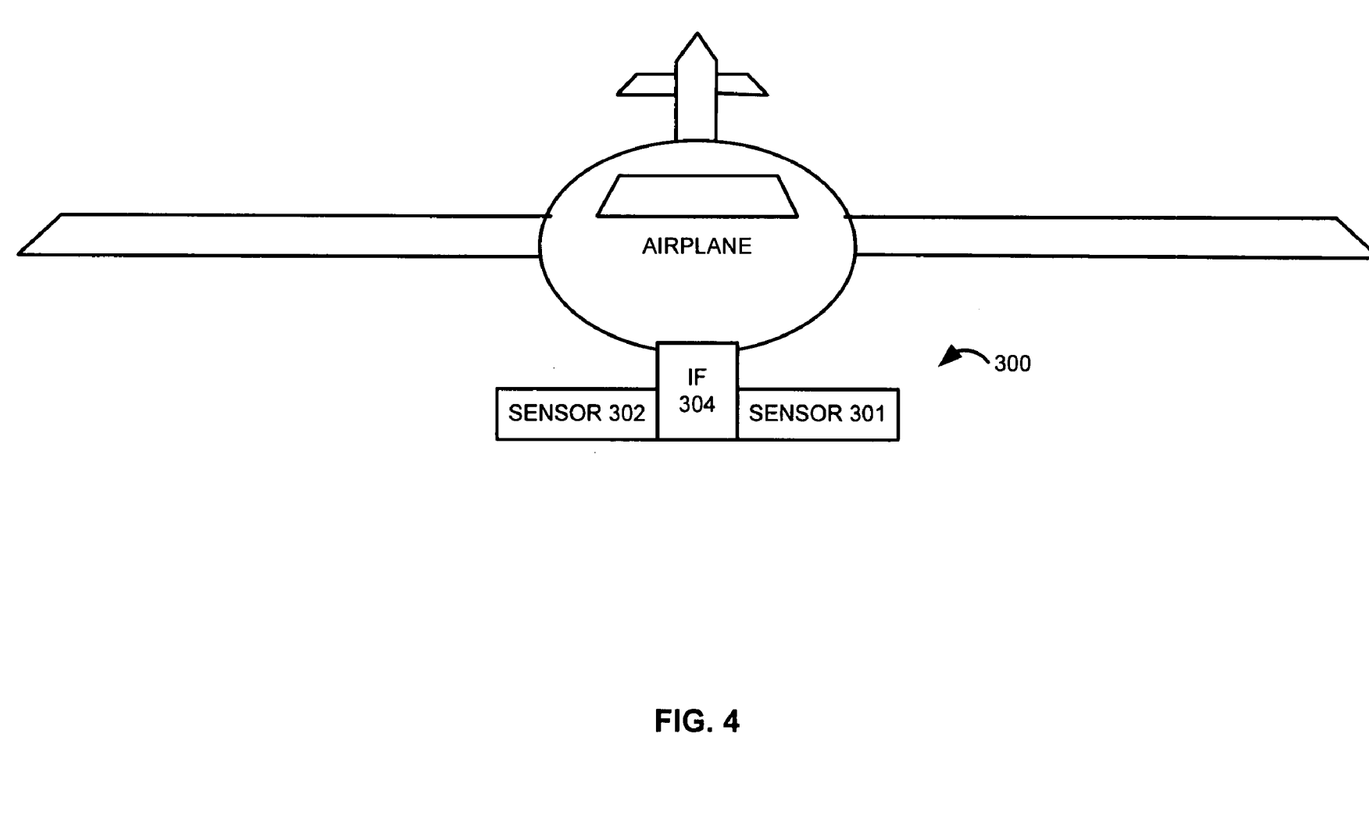
FIG. 4 illustrates a sensor system in an example of the invention.
Figure 5:
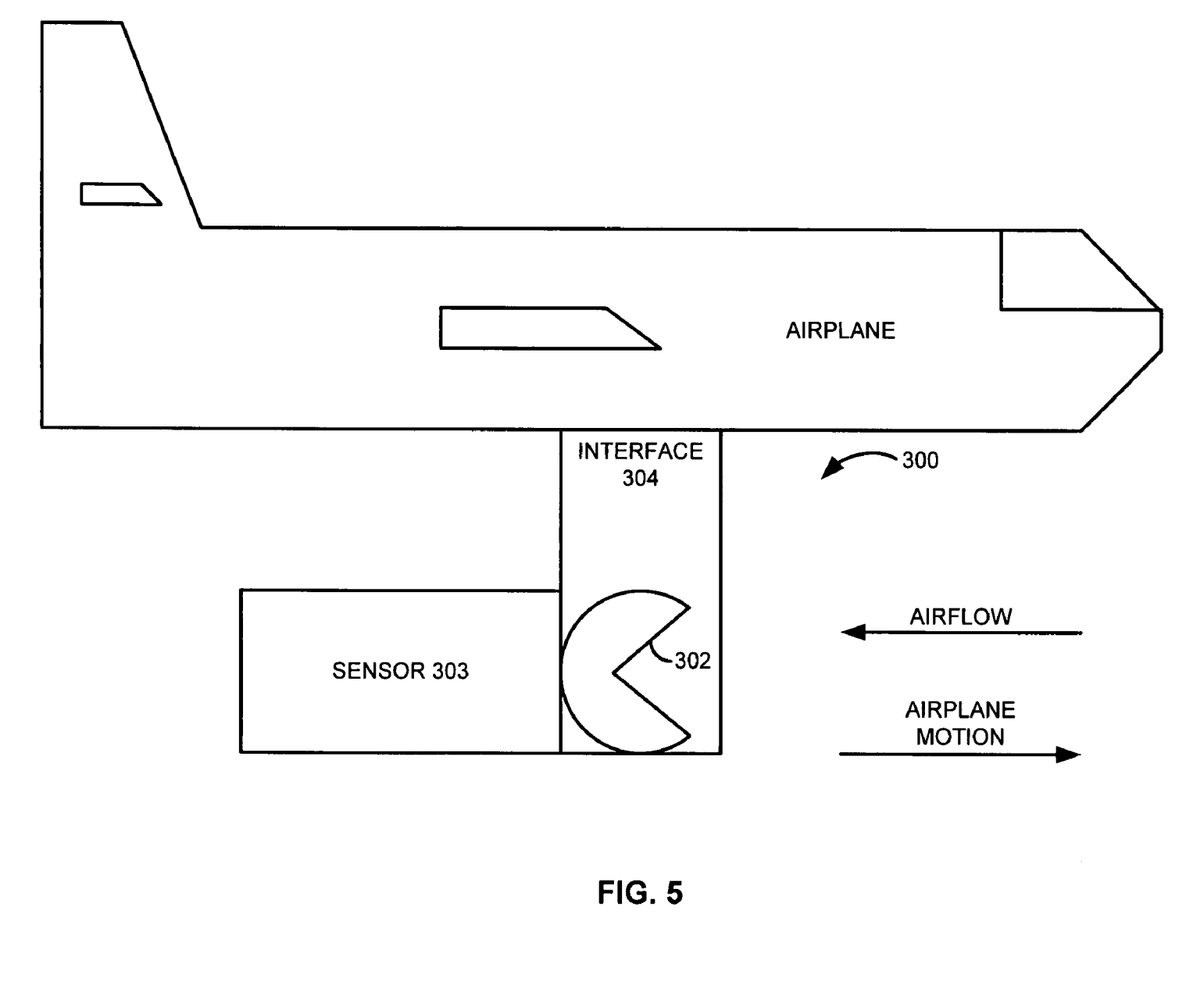
FIG. 5 illustrates a sensor system in an example of the invention.
Figure 6:
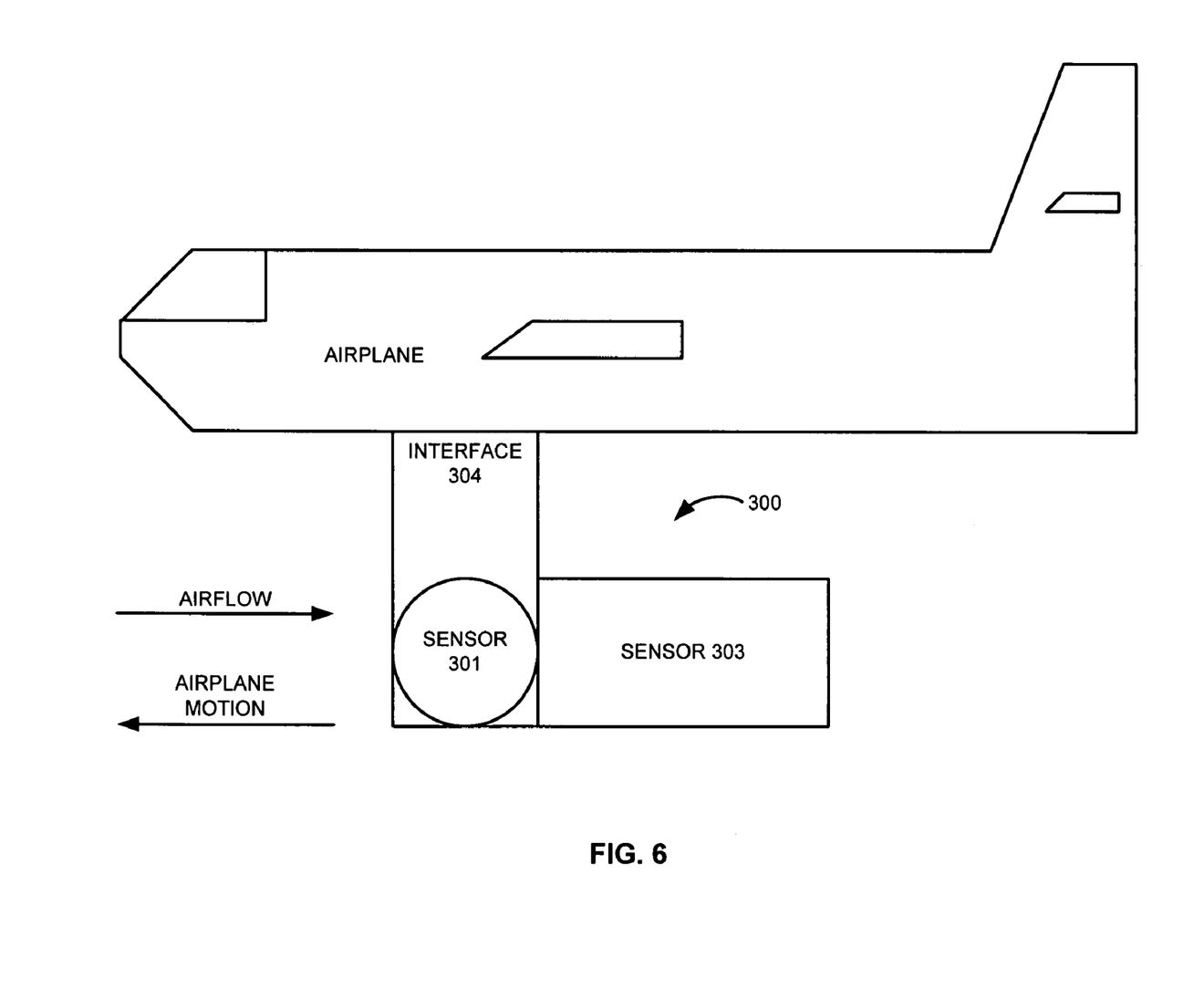
FIG. 6 illustrates a sensor system in an example of the invention.

FIG. 4 illustrates a front view of sensor system 300 in an example of the invention. The airplane on FIGS. 4–6 is not drawn to scale and is typically much larger than system 300. Note that the direction of airplane flight is out of the page, so the direction of airflow is into the page. Note that sensors 301 and 302 are exposed to airflow that is typically generated by the movement of the airplane, but that sensor 303 (not shown) is shielded from the airflow by interface 304 and sensors 301–302. Also note that sensors 301 and 302 present the same cross-sectional area to this airflow.

FIG. 5 illustrates a side view of sensor system 300 in an example of the invention. Note the reentrant shape of the cylinder that comprises sensor 302. The reentrant shape forms a triangular indentation into the side of the cylinder. The indentation runs along the length of the cylinder that faces the airflow. Advantageously, the reentrant shape of sensor 302 traps both ice and water. In addition, the reentrant shape along the length of the cylinder tends to trap ice better than the reentrant cone shown in prior art FIG. 2.

FIG. 6 illustrates the other side view of sensor system 300 in an example of the invention. Note that sensor 301 is also cylinder, but sensor 301 does not have the reentrant shape.

Thus, ice particles tend to bounce off of sensor 301 while water spreads over the surface of sensor 301.

Interface 304 could be made of metal or some other suitable material. Interface 304 should be configured for attachment to the airplane with a single attachment. A single attachment only requires a single penetration of the airplane skin for attachment to the airplane. Interface 304 should be configured to hold sensors 301–303 firmly in place during flight, and also provide access to sensors 301–303 for the temperature and power wiring. Interface 304 may also house circuitry that controls system operation.

If desired, interface 304 could be configured to allow ground personnel to adjust the orientation of sensors 301–303 before a flight to optimize sensor performance based on the aerodynamic characteristics of the airplane. For example, interface 304 could allow sensors 301–303 to rotate to a new position around the axis of interface 304. Interface 304 could allow sensors 301–303 to modify their angle to interface 304. Interface 304 could allow sensor 302 to rotate about its own axis to modify the angle of the reentrant shape relative to the direction of flight.

Sensors

Figure 7:
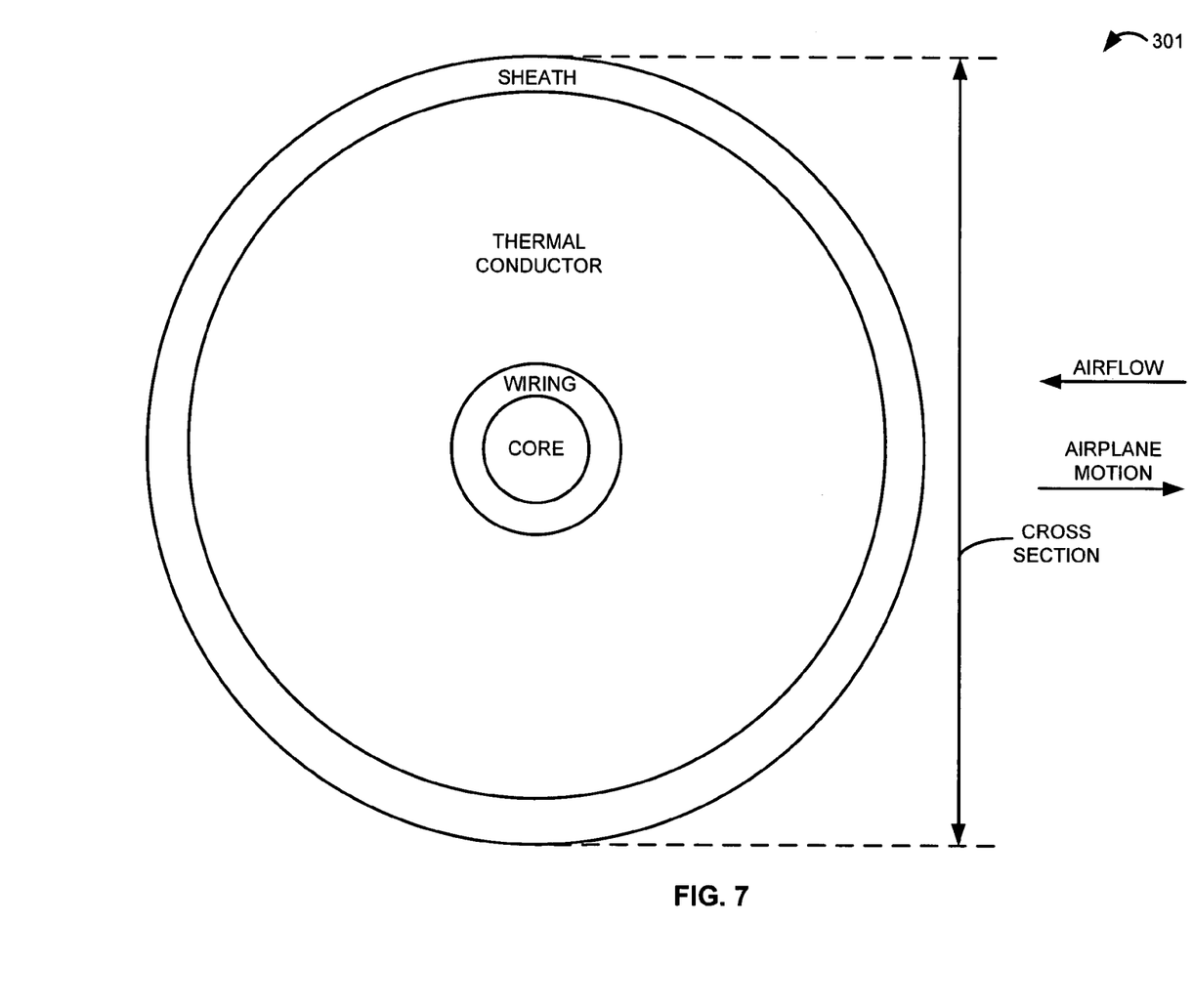
FIG. 7 illustrates a sensor for the sensor system in an example of the invention.

FIG. 7 illustrates a cut-away view looking into the side of sensor 301 in an example of the invention. Sensor 301 has a central core that extends from one end of the cylinder to the other. The core could be air within a metal tube or some other suitable material. Sensor 301 has power wiring that is wound around the core from one end of the cylinder to the other. The power wiring could be copper, nickel, or some other suitable material. Sensor 301 has a thermal conductor surrounding the power wiring from one end of the cylinder to the other. The thermal conductor could be brass, steel, silver solder or some other suitable material. Sensor 301 has a sheath around the thermal conductor. The sheath could be metal oxide or some other suitable material. A temperature sensor is also placed within or on the surface of the sheath with temperature wiring extending to the end of the cylinder at interface 104. Sensor 301 could have a 3 mm diameter, a 10 mm diameter, or some other suitable diameter. Sensor 301 could be 50 mm long, 100 mm long, or some other length.

In some examples, sensor 301 could be manufactured as follows, although other techniques and materials could be used in other examples. A length of wire that will form the power wiring is doubled up twice to form a four-wire length with the hot and cold leads at the same end. The four-wire length is wound around the core from one end to the other so the hot and cold leads reach interface 104. Thus, the power wiring enters and exits sensor 301 at the same end near interface 104, so only one support (interface 104) is required to ingress/egress the wiring. The wiring is braised to the core. The wiring, core, and a temperature sensor are placed within a sheath, and the sheath is filled with silver solder. The filled sheath is shaken and packed to remove air in the silver solder, and the sheath is sealed.

Other than its shielded orientation behind interface 304, sensor 303 could be the same as sensor 301. The difference in power consumption between sensor 301 and sensor 303 indicates the amount of water in the atmosphere. The difference in power consumption between sensor 302 and sensor 303 indicates the amount of ice and water in the atmosphere.

Figure 8:
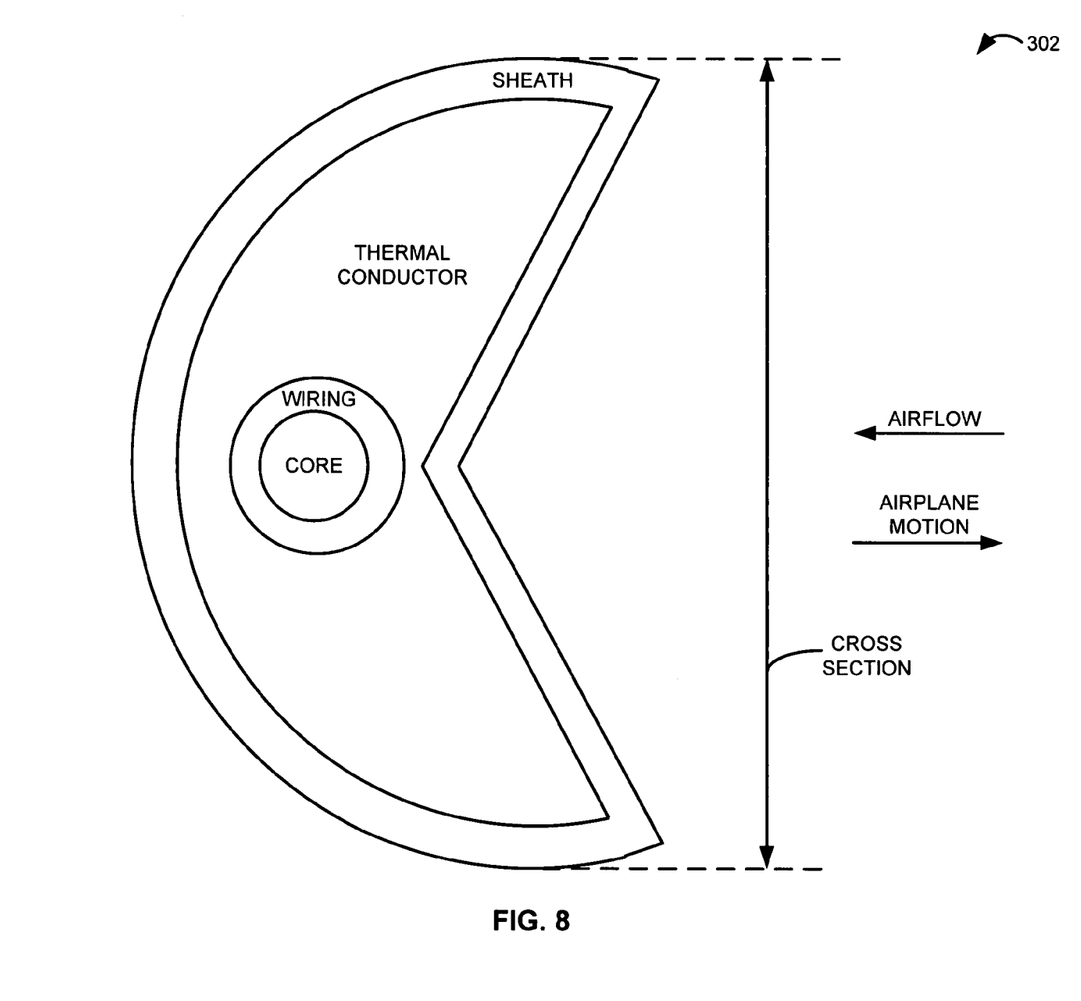
FIG. 8 illustrates a sensor for the sensor system in an example of the invention.

FIG. 8 illustrates a cut-away-view looking into the side of sensor 302 in an example of the invention. Sensor 302 has a central core, winding, thermal conductor, temperature sensor, and sheath that extends from one end of the cylinder to the other in a similar fashion to sensor 301. Note the reentrant shape of sensor 302 that forms a triangular indent in the cylinder from one end of the cylinder to the other. The triangular indent faces into the airflow to trap ice and water within the indent. In some examples, the angle of the indent is between 90 and 110 degrees.

Referring to both FIGS. 7 and 8, note that sensors 301 and 302 have the same cross-section relative to the airflow. Since sensors 301–302 are typically the same length, sensors 301–302 present the same cross-sectional area to the air flow. Advantageously, the same cross-sectional area presented to the airflow gives sensors 301 and 302 substantially the same collection efficiency. As described above, the collection efficiency is the ratio of the total amount water in a given volume versus the actual amount of water that is collected and evaporated by a sensor traveling through the volume. Thus, sensors 301–302 will each collect and evaporate substantially the same amount of water in a given volume. In the context of the invention, collection efficiencies are substantially the same when they are within 5% of one another.

Sensor System Circuitry

Figure 9:
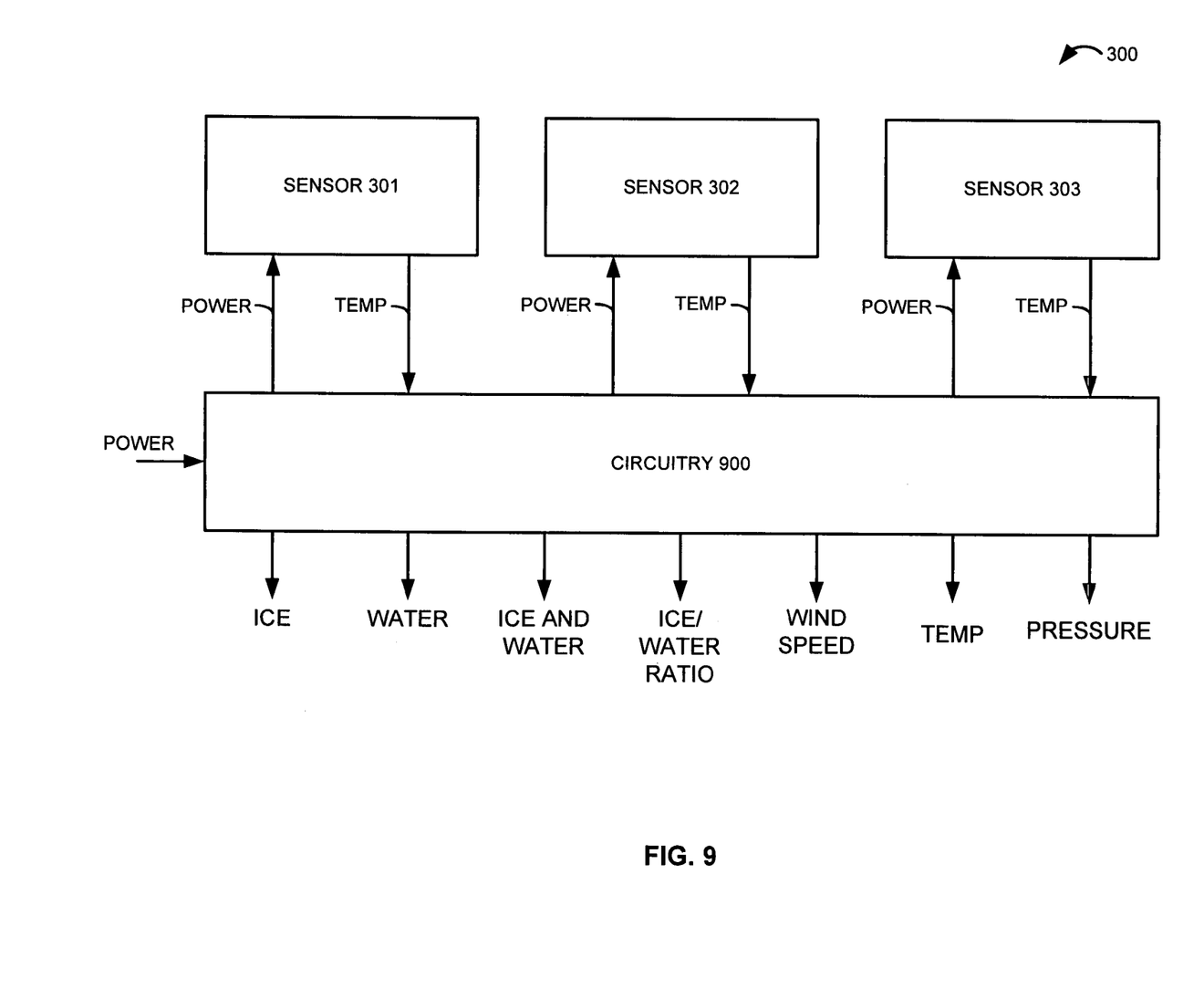
FIG. 9 illustrates a sensor system in an example of the invention.

FIG. 9 illustrates a schematic view of sensor system 300 in an example of the invention. Sensors 301–303 are shown along with circuitry 900. Circuitry 900 could be housed in interface 104, within the airplane, or be located on the ground. Circuitry 900 could be distributed between these locations. Circuitry 900 receives a power feed (or uses a battery) and also receives individual temperature feeds from sensors 301–303. Circuitry 900 individually controls the power transferred to sensors 301–303 to maintain the sensors at a substantially constant temperature.

The substantially constant temperature may be allowed to drift downward after a period of heating based on the desired duty cycle for the heating components. In addition, circuitry 900 may change the substantially constant temperature based on the measured concentrations of ice and water. For example, if the measured concentrations of ice or water is so high that the sensors may become saturated and unable to evaporate all of the water, then circuitry 900 could increase the substantially constant temperature, so the sensors can evaporate water faster and avoid saturation.

Circuitry 900 processes the individual power consumption of sensors 301–303 to provide the concentration of ice, the concentration of water, the concentration of combined ice and water, and the ratio of ice to water. The concentrations are typically provided in grams per cubic meter. Circuitry 900 determines the water concentration using the difference in power consumption between sensors 301 and 303. Circuitry 900 determines the ice and water concentration using the difference in power consumption between sensors 302 and 303. Circuitry 900 determines the ice concentration by subtracting the water concentration from the ice and water concentration. The ratio is determined by dividing one of the ice concentration or the water concentration by the other. Circuitry 900 may also process the power consumption of sensor 303 as compared to sensors 301–302 to determine the wind speed, ambient temperature, and pressure. Alternatively, circuitry 900 may receive a data feed from the airplane that indicates ambient temperature, pressure, and air speed, and in this alternative, sensor 303 may be omitted from sensor system 300.

Circuitry 900 includes components for processing, communication, and storage. Circuitry could include software and/or firmware or some other form of machine-readable processing instructions to direct system operations. Circuitry 900 could use general-purpose integrated circuitry and/or special purpose circuitry. Circuitry 900 could provide a minimum response time of time 0.1 second (for cloud data), a minimum response time of time 1 second (for general precipitation data), or use some other response time.

To perform the calculation, circuitry 900 should account for the latent heat of melting ice and the latent heat of evaporating water. Since the two latent heats are different, a ratio of ice to water is estimated to handle the different latent heats for melting and evaporation in the initial ice and water concentration calculation. The estimated ratio may be generated based on some metric, such as temperature, or may be set by the operator. Once, the concentration are actually determined, the actual ratio of ice to water may be used in a second order calculation to improve the accuracy of the ice and water concentration outputs.

Combination of Sensor Systems

Figure 10:
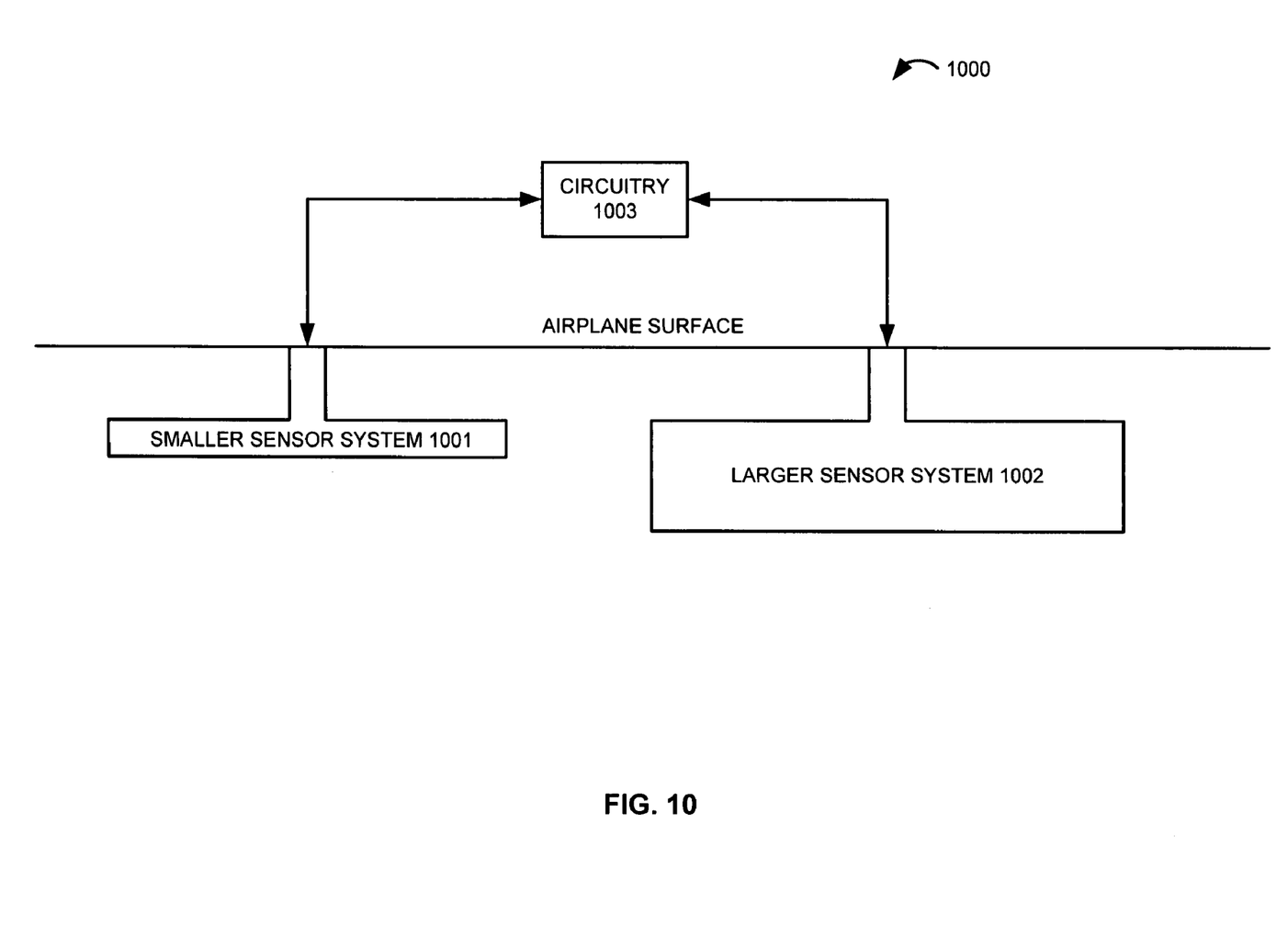
FIG. 10 illustrates a combination of sensor systems in an example of the invention.

FIG. 10 illustrates a combination 1000 of sensor systems in an example of the invention. Combination 1000 includes smaller sensor system 1001, larger sensor system 1002, and circuitry 1003. Sensor systems 1001–1002 could be similar to sensor system 300. Sensor system 1001 is referred to as smaller, and sensor system 1002 is referred to as larger, because the sensor diameter of smaller system 2001 is smaller than the sensor diameter of larger system 1002. For example, the sensor diameter for system 1001 could be 3 millimeters, and the sensor diameter for system 1002 could be 10 millimeters.

Sensors systems 1001–1002 transfer data to circuitry 1003. Circuitry 1003 processes the data from the multiple sensors to improve the accuracy of the measurements. Circuitry 1003 could be similar to circuitry 900. Circuitry 1003 is shown as separate from systems 1001–1002, but circuitry 1003 could be integrated within one or both of sensor systems 1001–1002.

Within the same sensor system, the sensors (i.e. water-only sensor 301 and ice/water sensor 302) have similar sizes, so the collection efficiencies of the sensors is comparable for particles of equal size and density. This collection efficiency also depends on sensor diameter, so that employment of sensor systems 1001–1002 having different sensor diameters enables small particles to be collected by smaller sensor system 1001 and the much rarer large particles to be collected by larger sensor system 1002 in numbers sufficient for a useful measurement. For example, small cloud particles would be collected by smaller sensor system 1001, but not by larger sensor system 1002. Larger precipitation particles would be collected by larger sensor system 1002, but not collected sufficiently frequently by smaller sensor system 1001 for a useful measurement.

The collection of water drops depends on their size, and the collection of ice particles depends on their size, density, and shape. In a mixed cloud of both ice and water particles, both ice and water particles are collected together by the ice/water sensor (i.e. sensor 302). Most ice particles bounce off of the water-only sensor (i.e. sensor 301) which then measures water content. Thus, ice and water content may be measured independently. A correction may be desired for the water-only sensor (i.e. sensor 301) because a small amount of ice may occasionally collect at the stagnation line along the cylinder, and the ice could be mistakenly interpreted as water. This situation could occur in a completely ice cloud as well as a mixed ice/water cloud. Combining data-from both sensor systems 1001–1002 and information on ambient temperature and particle size, shape, and density from other measurement systems (such as a video cloud microscope system) enables circuitry 1003 to mitigate the effect of unwanted ice on the water-only sensor from the water concentration measurement. Additional sensor systems having other sensor diameters could be used to further hone this measurement.

Variations

Those skilled in the art will appreciate numerous variations of sensor system 300 that fall within the scope of the invention. For example, sensor system 300 could be implemented on a vehicle other than an airplane, or may be mounted in a stationary position. Such alternative vehicles include cars, trucks, unmanned aerial vehicles, rockets, balloons, helicopters, and the like.

Sensor system 300 may not have reference sensor 303. Empirical testing could be used to correlate airspeed, ambient temperature, and ambient pressure to the amount of power required to maintain the reference sensor at the target temperature. Once the correlations are determined, system 300 circuitry could receive and process data that indicates actual airspeed, ambient temperature, and ambient pressure based on the correlations to estimate the power that would have be required to maintain a reference sensor at the target temperature. This estimate could be used in place of actual reference sensor power data, and thus, reference sensor 303 could be omitted from the system.

Sensor system may use shapes other than a cylinder, such as a polygon.

Sensor system 300 may detect and distinguish concentrations of non-frozen and frozen liquids other than ice and water.

Sensor system 300 may use a gyroscope, motor, or some other mechanism to properly orient itself into the wind.

Sensor system 300 may be used with a camera and computer where the camera and computer characterize ice and water particles by phase, shape, and density. This data can be used to validate the outputs of circuitry 900.

Advantages

Sensor system 300 provides ice concentrations and water concentrations for the atmosphere. The use of different sensors where one collects ice and one does not collect ice, but where both sensors have similar collection efficiencies for water improves the accuracy of the ice-only concentration over prior sensor systems. In addition, sensor system 300 is robust and requires minimal attachment to the airplane.

The invention claimed is:

1. A sensor system comprising:
a first sensor configured to collect non-frozen liquid with a first collection efficiency, but not to collect frozen liquid;
a second sensor configured to collect the non-frozen liquid with a second collection efficiency and to collect the frozen liquid, wherein the first collection efficiency and the second collection efficiency are substantially equivalent; and
circuitry configured to maintain the first sensor and the second sensor at a substantially constant temperature and to determine a measurement of the frozen liquid based on maintaining the first sensor and the second sensor at the substantially constant temperature.

2. The sensor system of claim 1 wherein the first sensor has a first cross-section relative to airflow and the second sensor has a second cross-section relative to the airflow, and wherein the first cross-section and the second cross-section are substantially equivalent.

3. The sensor system of claim 2 wherein the second sensor comprises a cylinder that has a reentrant shape that forms an indentation along a length of the cylinder.

4. The sensor system of claim 1 further comprising an interface connected to the first sensor and the second sensor, and configured for a single attachment to an airplane.

5. The sensor system of claim 1 further comprising a third sensor configured not to collect the non-frozen liquid and not to collect the frozen liquid, but exposed to a same ambient temperature as the first sensor and the second sensor.

6. The sensor system of claim 1 wherein the circuitry includes wiring to heat the first sensor and the second sensor, wherein the wiring enters and exits the first sensor at a same end of the first sensor, and wherein the wiring enters and exits the second sensor at a same end on the second sensor.

7. The sensor system of claim 1 wherein the circuitry is configured to determine the measurement of the frozen liquid based on a first amount of power consumed to maintain the first sensor at the substantially constant temperature and a second-amount of power consumed to maintain the second sensor at the substantially constant temperature.

8. The sensor system of claim 1 wherein the measurement of the frozen liquid comprises an amount of the frozen liquid per volume of atmosphere.

9. The sensor system of claim 1 wherein the circuitry is configured to determine a measurement of the non-frozen liquid based on maintaining the first sensor and the second sensor at the substantially constant temperature.

10. The sensor system of claim 9 wherein the measurement of the non-frozen liquid comprises an amount of the non-frozen liquid per volume of atmosphere.

11. The sensor system of claim 1 wherein the measurement of the frozen liquid comprises a ratio of an amount of the frozen liquid versus an amount of the non-frozen liquid in the atmosphere.

12. The sensor system of claim 11 wherein the circuitry is configured to use the ratio and a latent heat of melting the frozen liquid to determine an amount of the frozen liquid per volume of atmosphere.

13. A method of operating sensor system, the method comprising:
in a first sensor, collecting non-frozen liquid with a first collection efficiency, but not collecting frozen liquid;
in a second sensor, collecting the non-frozen liquid with a second collection efficiency and collecting the frozen liquid, wherein the first collection efficiency and the second collection efficiency are substantially equivalent;
maintaining the first sensor and the second sensor at a substantially constant temperature; and
determining a measurement of the frozen liquid based on maintaining the first sensor and the second sensor at the substantially constant temperature.

14. The method of claim 13 wherein the first sensor has a first cross-section relative to airflow and the second sensor has a second cross-section relative to the airflow, and wherein the first cross-section and the second cross-section are substantially equivalent.

15. The method of claim 13 wherein the second sensor comprises a cylinder that has a reentrant shape that forms an indentation along a length of the cylinder.

16. The method of claim 13 further comprising connecting an interface to an airplane at a single attachment wherein the interface is connected to the first sensor and the second sensor.

17. The method of claim 13 further comprising exposing a third sensor to a same ambient temperature as the first sensor and the second sensor, wherein the third sensor does not collect the non-frozen liquid and does not collect the frozen liquid, and maintaining the third sensor at the substantially constant temperature.

18. The method of claim 13 wherein the sensor system includes wiring to heat the first sensor and the second sensor, wherein the wiring enters and exits the first sensor at a same end of the first sensor, and wherein the wiring enters and exits the second sensor at a same end on the second sensor.

19. The method of claim 13 wherein determining the measurement of the frozen liquid comprises determining the measurement of the frozen liquid based on a first amount of power consumed to maintain the first sensor at the substantially constant temperature and a second amount of power consumed to maintain the second sensor at the substantially constant temperature.

20. The method of claim 13 wherein the measurement of the frozen liquid comprises an amount of the frozen liquid per volume of atmosphere.

21. The method of claim 13 further comprising determining a measurement of the non-frozen liquid based on maintaining the first sensor and the second sensor at the substantially constant temperature.

22. The method of claim 21 wherein the measurement of the non-frozen liquid comprises an amount of the non-frozen liquid per volume of atmosphere.

23. The method of claim 21 wherein the measurement of the frozen liquid comprises a ratio of an amount of the frozen liquid versus an amount of the non-frozen liquid in the atmosphere.

24. The method of claim 23 further comprising using the ratio and a latent heat of melting the frozen liquid to determine an amount of the frozen liquid per volume of atmosphere.

25. A system of sensors comprising:
a first sensor system comprising a first sensor configured to collect non-frozen liquid with a first collection efficiency, but not to collect frozen liquid and a second sensor configured to collect the non-frozen liquid with a second collection efficiency and to collect the frozen liquid, wherein the first collection efficiency and the second collection efficiency are substantially equivalent;

a second sensor system comprising a third sensor configured to collect the non-frozen liquid with a third collection efficiency, but not to collect the frozen liquid and a fourth sensor configured to collect the non-frozen liquid with a fourth collection efficiency and to collect the frozen liquid, wherein the third collection efficiency and the fourth collection efficiency are substantially equivalent;

circuitry configured to maintain the first sensor and the second sensor at a first substantially constant temperature, determine a first measurement of the frozen liquid based on maintaining the first sensor and the second sensor at the first substantially constant temperature, maintain the third sensor and the fourth sensor at a second substantially constant temperature, determine a second measurement of the frozen liquid based on maintaining the third sensor and the fourth sensor at the second substantially constant temperature, and process the first measurement and the second measurement together to produce a result; and wherein the first sensor and the second sensor have a first size, and the third sensor and the fourth sensor have a second size wherein the first size is larger than the second size.

26. The system of claim 25 wherein the first sensor, the second sensor, the third sensor, and the fourth sensor comprises cylinders, the first size comprises a first cylindrical diameter, the second size comprises a second cylindrical diameter, and the first cylindrical diameter is larger than the second cylindrical diameter.

* * * * *